June 20, 1939.  L. F. SCHMIDT  2,163,106
ASSIST STRAP
Filed Aug. 9, 1937
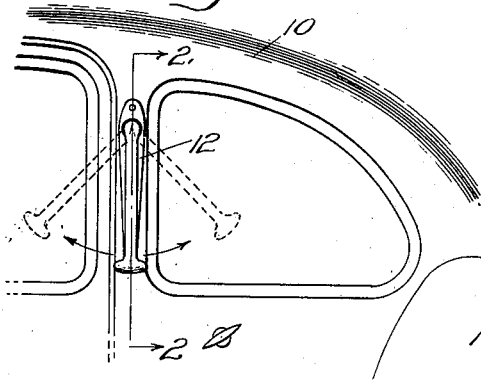
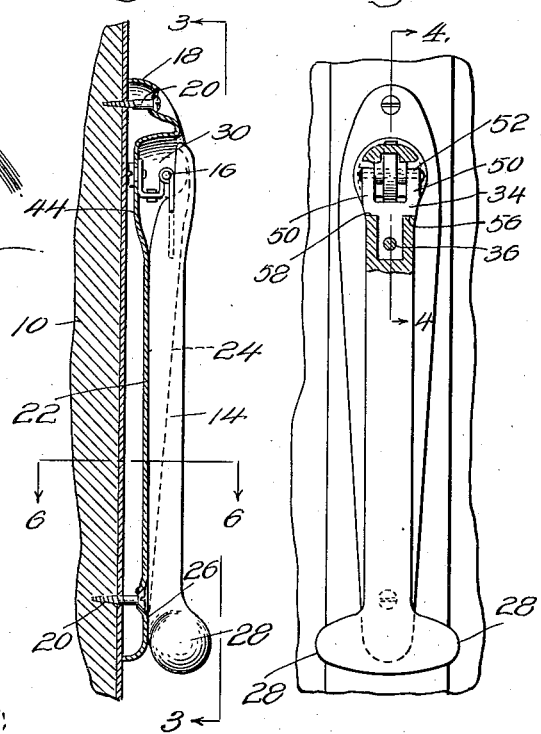
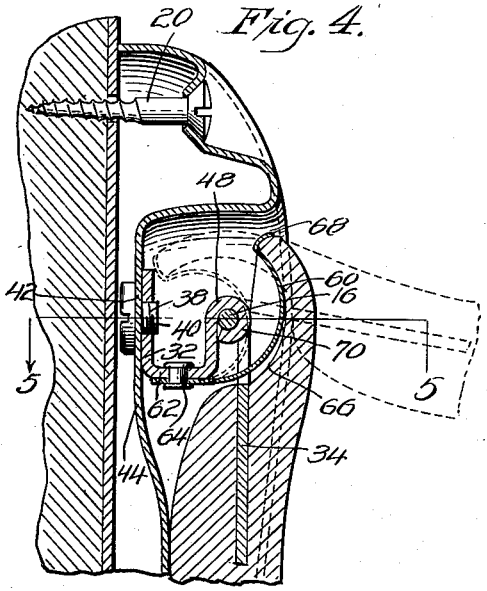
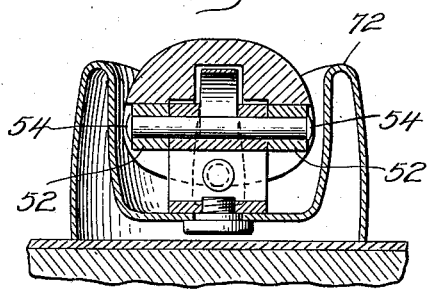
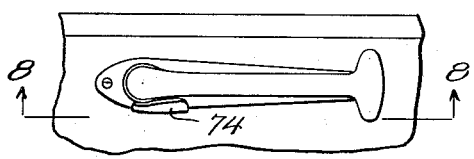
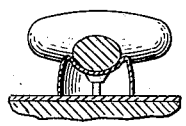
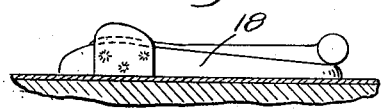
Louis F. Schmidt.
INVENTOR
BY Victor J. Evans & Co.
ATTORNEYS Patented June 20, 1939

2,163,106

UNITED STATES PATENT OFFICE 2,163,106

ASSIST STRAP

Louis F. Schmidt, Chicago, Ill.

Application August 9, 1937, Serial No. 158,191

10 Claims. (Cl. 105—354)

My invention relates to automotive vehicles and includes among its objects and advantages the provision of an improved assist strap.

In the accompanying drawing:

Fig. 1 is a fragmentary view of a vehicle showing my invention applied thereto;

Fig. 2 is a sectional view along the line 2—2 of Fig. 1;

Fig. 3 is a view taken from the position indicated by line 3—3 of Fig. 2 with certain parts broken away for the sake of clearness;

Fig. 4 is an enlarged view taken along the line 4—4 of Fig. 3;

Fig. 5 is a view taken along the line 5—5 of Fig. 4;

Fig. 6 is a view taken along the line 6—6 of Fig. 2;

Fig. 7 is an elevational view illustrating the assist strap located at right angles to the vertical position of Fig. 1; and Fig. 8 is a view taken along the line 8—8 of Fig. 7.

In the embodiment selected to illustrate my invention I make use of a vehicle 10 to the inner wall of which I mount the assist strap 12. Specifically, the assist strap comprises a rigid grip 14 pivotally connected at 16 with a base plate 18 attached to the body 10 by screws 20. Base plate 18 comprises metal depressed to provide a trough 22 within which the grip 14 is partly housed in its normal position, as indicated in Figs. 1 and 2. The walls 24 defining the trough 22 are angular with respect to the bottom of the trough and fade out, as indicated at 26. Lateral extensions 28 are provided at the lower end of the grip 14 to facilitate an effective grip.

The pivotal connection 16 comprises a hinge structure 30 made up of a U-shaped element 32 and a plate 34 embedded in the material of the grip 14. I prefer to shape the grip of plastic materials so that the plate 34 may be effectively anchored therein at the time of forming. In Fig. 3, I illustrate the plate 34 as being provided with an opening 36 for anchoring purposes. One leg of the U-shaped element 32 is provided with a threaded opening 38 for the reception of a screw 40 passing through an opening 42 in the depressed area 44 of the base plate 18. I provide the screw 40 with a shaft part 46 which lies loosely within the opening 42, but the shaft part provides a shoulder which abuts the element 32 for connection purposes. The shaft part 46 is sufficiently long to prevent pressure relation between the head of the screw and the base plate so that the grip 14 may be pivoted in either direction about the screw 40 as an axis, as indicated in dotted lines in Fig. 1. The threaded end of the screw 40 may be upset to prevent accidental loosening.

The other leg of the U-shaped element 32 is bent to provide a loop 48 embracing the pin 16, which loop lies between fingers 50 comprising integral parts of the plate 34 and looped about the pin 16, as at 52. The ends of the pin 16 are riveted at 54 to restrain the pin from longitudinal shifting. Plate 34 terminates in shoulders 56 which have abutting relation at 58 ith the grip 14.

To normally hold the grip 14 within the trough 22 I connect a spring 60 with the bight 62 of the U-shaped element 32 through the medium of a rivet 64. Spring 60 is housed within a recess 66 in the grip 14, and the free end of the spring includes a right-angular bend 68 which has abutting relation with the upper end of the grip 14. The tension of the spring 60 urges the grip 14 into the trough 22, but the grip may be moved within the trough against the tension of the spring about the axis 16. Loop 48 is cut away at 70 to provide additional space for the spring 60 when the grip 14 is pivoted outwardly to the dotted line position of Fig. 4.

In operation, the lower end of the grip 14 is so shaped and exposed as to be readily accessible, and the grip may be swung outwardly against the tension of the spring 60. The tension is such as to effectively hold the grip within the trough 22 but offers little resistance to the user when the grip is pulled outwardly. Because of the pivotal connection between the hinge structure 30 and the base plate 18, the grip 14 may be swung in either direction about its horizontal axis, and the tapering walls 24 are so shaped as to permit considerable lateral swinging of the grip before it has been shifted to a position substantially at right angles to the base plate. In use, the tension of the spring 60 is sufficient to move the grip 14 to its normal position regardless of its adjusted position when released. The walls 24 embody a gentle curvature 72 while their angularity is such as to cooperate with the spring tension for moving the grip to its normal position.

Because of the construction of the base plate 18, the assist strap may be mounted in any desirable location, and the design of the device as a whole is pleasing in appearance. When the grip is swung outwardly, the spring 60 tends to wrap about the loops 48 and 52 while the spring tension holds the bend 68 in effective relation with the end of the grip in all positions.

Figs. 7 and 8 illustrate the strap mounted in a horizontal position. When so mounted, the base plate 18 may be provided with a pressure plate 74 which lies in a horizontal plane and is so located as to lend support to the grip 14 when it is swung outwardly and downward pressure applied. Plate 74 may be welded to the base plate 18. While I have illustrated the assist strap as being associated with a plate attached to the vehicle, it is perfectly obvious that the wall structure of the vehicle may be originally designed to provide accommodation and mounting for the assist strap in lieu of the additional base plate.

Without further elaboration, the foregoing will so fully explain my invention that others may, by applying current knowledge, readily adapt the same for use under various conditions of service.

I claim:

1. An assist strap comprising a grooved support, a grip normally lying within the groove, a pivotal connection between one end of the grip and the support, a second pivotal connection between said one end of the grip and the support arranged at right angles to the first pivotal connection, said pivotal connections being so constructed and arranged as to provide a universal mounting for the grip, and resilient means cooperable with the grooved support and the assist strap for urging the latter into the groove, said groove being of such depth as to restrain the assist strap from accidental lateral displacement, but permitting the assist strap to be swung laterally thereof about the axis of one of said pivotal connections when the assist strap is pivoted outwardly of the groove about the axis of the other pivotal connection.

2. An assist strap comprising a support, a grip, a plurality of pivotal connections between one end of the grip and the support, and resilient means for yieldingly supporting the grip in a predetermined position, said pivotal connections being so constructed and arranged as to provide a universal mounting for the grip.

3. An assist strap comprising a support, a grip, a plurality of pivotal connections between one end of the grip and the support, and spring means associated with said pivotal connections and cooperating with the grip for holding the latter in a predetermined position, said pivotal connections being so constructed and arranged as to provide a universal mounting for the grip.

4. In a vehicle, a trough, a rigid assist strap normally lying in said trough, one end of the rigid assist strap being swingably connected with said trough, and resilient means cooperable on said trough and the rigid assist strap for urging the latter into the trough, said rigid assist strap being provided with a grip formation at its opposite end lying outside the trough in all positions of the assist strap.

5. In combination, a grooved support, said groove having side walls tapered in the direction of one end of the groove, an assist strap normally lying in said groove, one end of the assist strap being swingably connected with said support at the deep end of the groove, and resilient means cooperable on said support and the assist strap for urging the latter into the groove, the tapered side walls cooperating with the resilient means for guiding the assist strap into the groove, said groove being of such depth as to restrain the assist strap from accidental lateral displacement, but permitting the assist strap to be swung laterally thereof when the assist strap is swung outwardly of the groove pivotal connection.

6. In a vehicle, a supporting member shaped to provide a trough, an assist strap normally lying inside the trough, a hinge fixedly connected with one end of the assist strap and pivotally connected with said member, said hinge being so constructed and arranged as to permit the assist strap to be pivoted outwardly of the trough and laterally thereof, and a spring fixedly connected with a part of said hinge and having pressure relation with the assist strap for urging the same into the trough, the walls of said trough being of such depth as to restrain the assist strap from accidental lateral displacement but permitting the assist strap to be swung laterally thereof when pivoted outwardly of the trough.

7. In a vehicle, a supporting member shaped to provide a trough, an assist strap normally lying inside the trough, a hinge pivotally connected with one end of the assist strap and pivotally connected with said member, said hinge being so constructed and arranged as to permit the assist strap to be pivoted outwardly of the trough and laterally thereof, and a spring fixedly connected with a part of said hinge and having pressure relation with the assist strap for urging the same into the trough, the axis of the pivotal connection between the hinge and said support being at right angles to the axis of the hinge, the walls of said trough being of such depth as to restrain the assist strap from accidental lateral displacement but permitting the assist strap to be swung laterally thereof when pivoted outwardly of the trough.

8. In a vehicle, a supporting member shaped to provide a trough, an assist strap normally lying inside the trough, a hinge pivotally connected with one end of the assist strap and pivotally connected with said member, said hinge being so constructed and arranged as to permit the assist strap to be pivoted outwardly of the trough and laterally thereof, and a spring fixedly connected with a part of said hinge and having pressure relation with the assist strap for urging the same into the trough, the axis of the pivotal connection between the hinge and said support being at right angles to the axis of the hinge, said groove having angular side walls cooperating with said spring for guiding the assist strap into the trough, the walls of said trough being of such depth as to restrain the assist strap from accidental lateral displacement but permitting the assist strap to be swung laterally thereof when pivoted outwardly of the trough.

9. In a vehicle, a grooved support, an assist strap normally lying in said groove, and a universal connection between one end of the assist strap and said grooved support, said universal connection being so constructed and arranged as to permit the assist strap to be pivoted outwardly of the groove and laterally thereof, the walls of the groove in said support being of such depth as to restrain the assist strap from accidental lateral displacement but permitting the assist strap to be swung laterally thereof when pivoted outwardly of the groove.

10. In a vehicle, a grooved support, an assist strap normally lying in said groove, a universal connection between one end of the assist strap and said grooved support, said universal connection being so constructed and arranged as to permit the assist strap to be pivoted outwardly of the groove and laterally thereof, and resilient means cooperable on the assist strap and the grooved support for urging the assist strap into the groove, the walls of the groove in said support being of such depth as to restrain the assist strap from accidental lateral displacement but permitting the assist strap to be swung laterally thereof when pivoted outwardly of the groove.

LOUIS F. SCHMIDT.